(12) United States Patent
Chen

(10) Patent No.: US 9,966,839 B2
(45) Date of Patent: May 8, 2018

(54) SWITCHING POWER SUPPLY DEVICE

(71) Applicant: FUJI ELECTRIC CO., LTD., Kawasaki (JP)

(72) Inventor: Jian Chen, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 146 days.

(21) Appl. No.: 14/988,289

(22) Filed: Jan. 5, 2016

(65) Prior Publication Data

US 2016/0241149 A1 Aug. 18, 2016

(30) Foreign Application Priority Data

Feb. 12, 2015 (JP) ................... 2015-025280

(51) Int. Cl.
*H02M 3/335* (2006.01)
*H02M 1/36* (2007.01)
*H02M 1/32* (2007.01)
*H02M 1/00* (2006.01)

(52) U.S. Cl.
CPC ............... *H02M 1/36* (2013.01); *H02M 1/32* (2013.01); *H02M 3/33523* (2013.01); *H02M 2001/0006* (2013.01)

(58) Field of Classification Search
CPC .. H02M 1/36; H02M 1/4258; H02M 3/33507; H02M 3/33515; H02M 3/33523; Y02B 70/126
See application file for complete search history.

(56) References Cited

U.S. PATENT DOCUMENTS

2008/0175027 A1 7/2008 Shimada et al.
2014/0078792 A1* 3/2014 Yabuzaki .......... H02M 3/33507
363/53

FOREIGN PATENT DOCUMENTS

JP 2001-309655 11/2001
JP 2008-54478 3/2008

* cited by examiner

*Primary Examiner* — Nguyen Tran
*Assistant Examiner* — Monica Mata

(57) ABSTRACT

A switching power supply device includes an energy storage element which is charged with a voltage generated in an auxiliary winding of a transformer; a switching control circuit to which the terminal voltage of the energy storage element is given as a power supply voltage and which controls the switching operation of a switching element; an initial operation control circuit which, when it is detected that the power supply voltage is lower than a first voltage, causes a current supply circuit to stop the switching operation until the power supply voltage rises to a second voltage; and a switching suppression circuit which, when it is detected that the power supply voltage is lower than a third voltage which is higher than the first voltage and lower than the second voltage, causes the current supply circuit to stop the switching operation for a predetermined period.

10 Claims, 7 Drawing Sheets

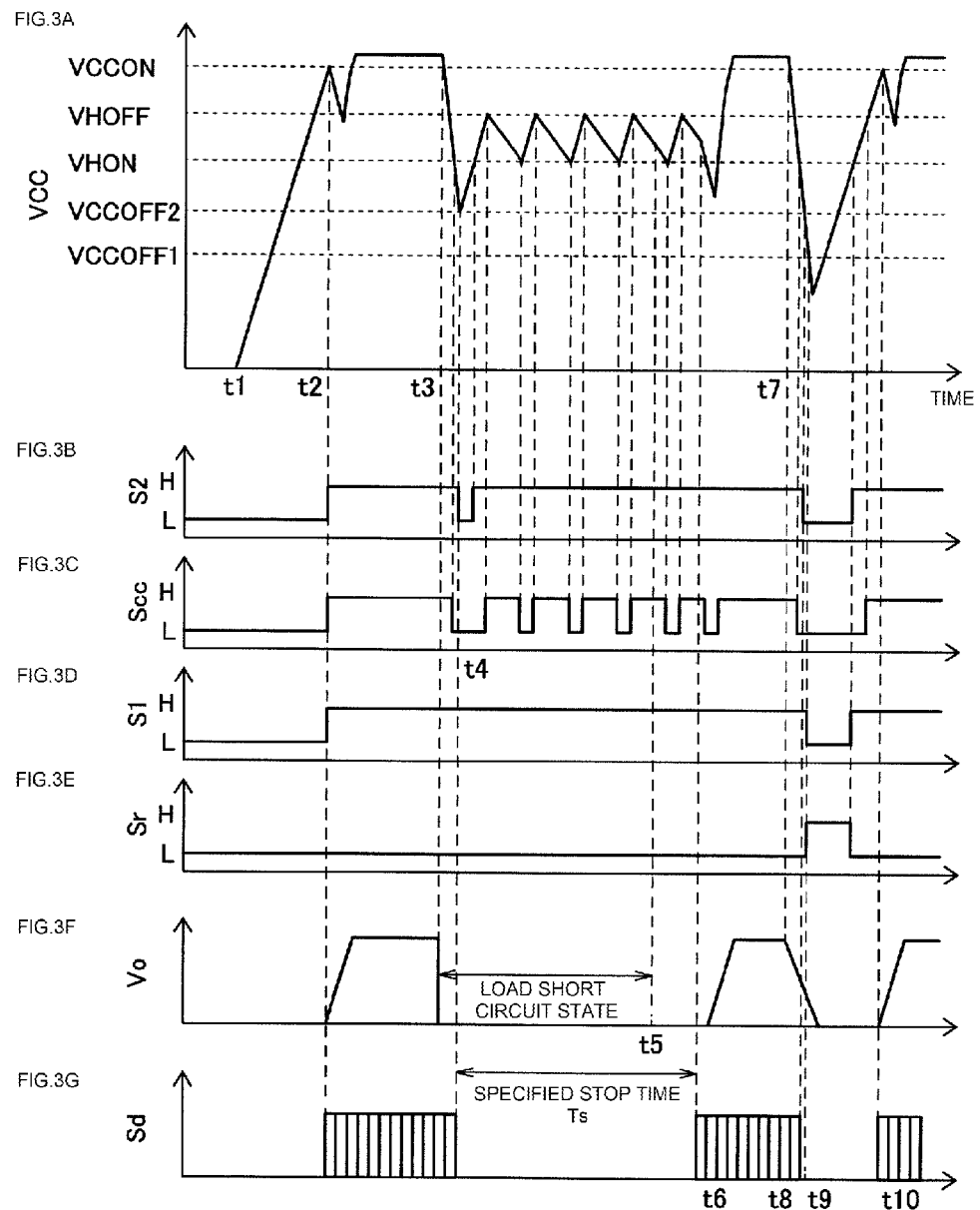

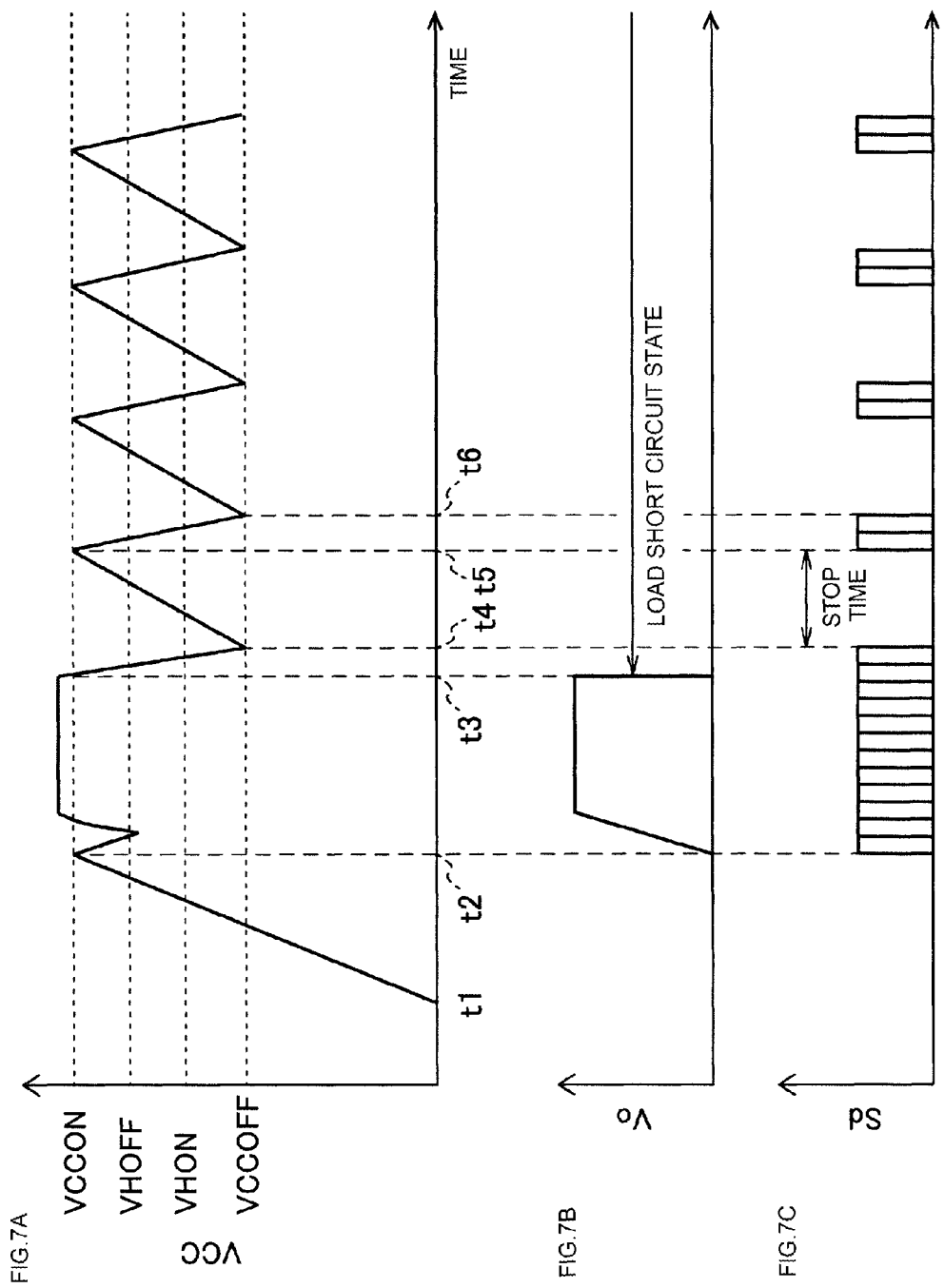

SWITCHING POWER SUPPLY DEVICE

CROSS-REFERENCE TO RELATED APPLICATIONS

This application claims benefit of foreign priority to Japanese Application 2015-025280 filed on Feb. 12, 2015, the disclosure of which is incorporated herein by reference.

BACKGROUND

1. Field

The present disclosure relates to a switching power supply device.

2. Related Art

FIG. 6 is a circuit configuration diagram of an example of a flyback type switching power supply device. A switching power supply device 100 includes a capacitor Ci, an electronic circuit 101, a transformer T having a primary winding P1, a secondary winding S1, and an auxiliary winding P2, and a switching element Q. Also, the switching power supply device 100 includes a first rectifying and smoothing circuit, which includes a rectifier diode D1 and an output capacitor Co, and a second rectifying and smoothing circuit which includes a rectifier diode D2 and a capacitor CVCC. The electronic circuit 101 includes a switching control circuit 102, which controls on/off of the switching element Q, that is, the switching operation of the switching element Q, and a start circuit 103. The switching element Q may be, for example, a MOSFET.

The capacitor Ci, connected to a primary side power source, smooths and inputs an input voltage Vi into the switching power supply device 100. One end of the primary winding P1 of the transformer T is connected to the primary side power source, and the input voltage Vi is applied to the one end of the primary winding P1. The start circuit 103 is connected to the positive terminal of the capacitor Ci, and the input voltage Vi is applied to the start circuit 103, while the start circuit 103 is connected to the one end of the primary winding P1 of the transformer T as well as to the switching control circuit 102. The switching element Q is connected in series between the other end of the primary winding P1 and a ground line.

Also, the capacitor CVCC is connected to the auxiliary winding P2 of the transformer T via the rectifier diode D2. The capacitor CVCC is charged with a voltage generated in the auxiliary winding P2, and the terminal voltage of the capacitor CVCC is supplied to the switching control circuit 102 as a power supply voltage VCC.

The switching control circuit 102 outputs a drive signal Sd to the switching element Q and turns the switching element Q on/off. When the switching element Q turns on, power energy from the input voltage Vi is stored in the transformer T. Subsequently, when the switching element Q turns off, the power energy stored in the transformer T is emitted from the secondary winding S1. The emitted power energy is rectified and smoothed by the rectifier diode D1 and output capacitor Co, and an output voltage Vo is obtained.

The start circuit 103 operates with the input voltage Vi which is the primary side power source, and supplies to the capacitor CVCC a current obtained from the primary side power source, thus charging the capacitor CVCC, from the switching power supply device 100 being started until the output voltage Vo is obtained. The current supplied to the capacitor CVCC from the start circuit 103 may hereafter be described as a "start current".

A description will be given, referring to FIGS. 7A through 7C, of an operation of the switching power supply device 100. FIG. 7A is a timing chart of a power supply voltage VCC, FIG. 7B is a timing chart of the output voltage Vo, and FIG. 7C is a timing chart of the drive signal Sd.

When the switching power supply device 100 is started at a time t1, the start circuit 103 supplies the start current to the capacitor CVCC. By so doing, the power supply voltage VCC rises. When the power supply voltage VCC reaches a start voltage VCCON at a time t2, the switching control circuit 102 stops the supply of the start current and starts the output of the drive signal Sd. That is, the switching control circuit 102 starts the switching operation of the switching element Q. By so doing, the output voltage Vo rises.

The reason for the power supply voltage VCC to drop slightly immediately after the switching operation starts at the time t2 is that the switching control circuit 102 which has started the output of the drive signal Sd consumes the energy of the capacitor CVCC before being supplied with sufficient power from the auxiliary winding P2.

A case is assumed in which a drop in the output voltage Vo due to overload or load short circuit occurs at a time t3. As the voltage of the auxiliary winding P2 is proportional to the output voltage Vo, the power supply voltage VCC also drops when the output voltage Vo drops. At a time t4, when the power supply voltage VCC drops to a undervoltage lockout (UVLO) level VCCOFF, the electronic circuit 101 is reset and initialized, and an initial operation (a start operation) is started. The switching control circuit 102 stops the output of the drive signal Sd during the initial operation. By so doing, the switching operation of the switching element Q stops. Also, the start circuit 103 supplies the start current until the power supply voltage VCC reaches the start voltage VCCON. When the power supply voltage VCC reaches the start voltage VCCON at a time t5, the switching control circuit 102 stops the supply of the start current and starts the switching operation of the switching element Q. As overload or load short circuit is continuing and the output voltage Vo remains low, the power supply voltage VCC drops when the switching operation is started, and when the power supply voltage VCC drops to the undervoltage lockout level VCCOFF at a time t6, the electronic circuit 101 is initialized again.

As the current consumption of the switching control circuit 102 in a period in which the switching operation stops is negligibly small, a stop time Tstop for which the switching operation stops depends on the capacitance of the capacitor CVCC, as shown in the following expression (1).

$$Tstop = CVCC*(VCCON - VCCOFF)/Ist \qquad (1)$$

Herein, Ist indicates the start current. VHON and VHOFF shown in FIG. 7A are the values of the power supply voltage VCC at which the start circuit 103 starts and stops the current supply to the capacitor CVCC in a period other than the initial operation. It is described in Japanese Patent Application Publication No. 2008-54478 that the stop time of the switching operation is lengthened by switching the start current to a smaller value.

By securing the stop time Tstop of the switching operation, it is possible to suppress heat generation in a load or in parts of the switching power supply device 100 when overload or load short circuit occurs. However, the stop time Tstop is limited by the capacitance of the capacitor CVCC.

SUMMARY

Therefore, the disclosure relates to increasing the degree of freedom to set a stop time of a switching operation when overload or load short circuit occurs, as one realizable benefit of the embodiments.

According to one aspect of the disclosure, there is provided a switching power supply device including a switching element connected to a power source via a primary winding of a transformer; an energy storage element which is charged with a voltage generated in an auxiliary winding of the transformer; a switching control circuit to which the terminal voltage of the energy storage element is given as a power supply voltage and which controls the switching operation of the switching element; a current supply circuit which supplies a current to the energy storage element from the power source without involving the transformer; an initial operation control circuit which, when it is detected that the power supply voltage is lower than a first voltage, causes the current supply circuit to stop the switching operation until the power supply voltage rises to a second voltage; and a switching suppression circuit which, when it is detected that the power supply voltage is lower than a third voltage which is higher than the first voltage and lower than the second voltage, causes the current supply circuit to stop the switching operation for a predetermined period.

According to the above aspect of the disclosure, it is possible to increase the degree of freedom to set the stop time of the switching operation when overload or load short circuit occurs.

BRIEF DESCRIPTION OF THE DRAWINGS

These and/or other aspects and advantages will become apparent and more readily appreciated from the following description of the embodiments, taken in conjunction with the accompanying drawings of which:

FIGS. 3A through 3G are illustrations of other examples of the operation of the switching power supply device shown in FIG. 1.

FIGS. 7A through 7C are illustrations of an operation of the switching power supply device shown in FIG. 6.

DESCRIPTION OF EMBODIMENTS

Hereafter, a description will be given, based on the drawings, of embodiments of the disclosure.

First Embodiment

Configuration

Figure 1:
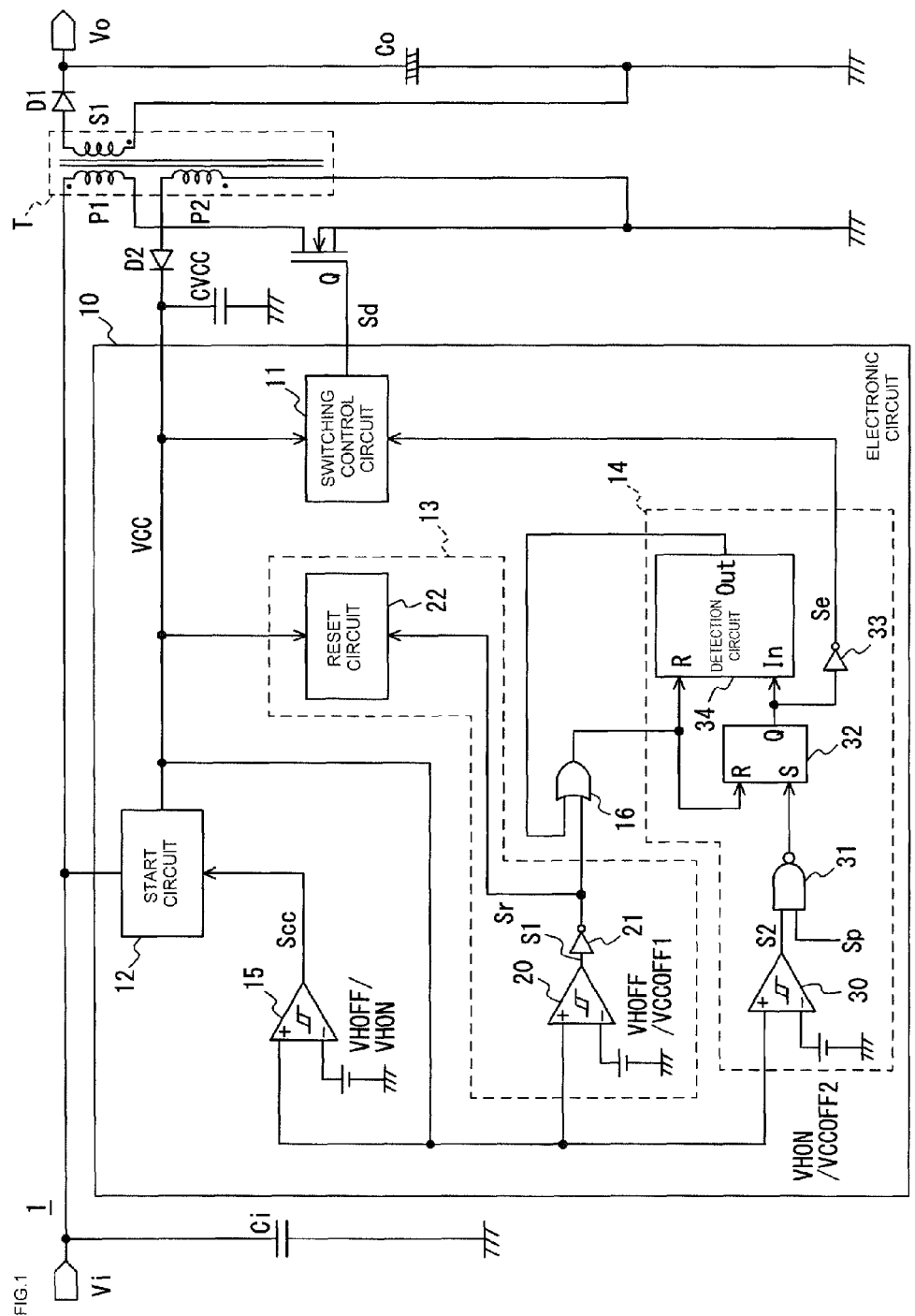
FIG. 1 is a circuit configuration diagram of an example of a switching power supply device according to a first embodiment.
Figure 6:
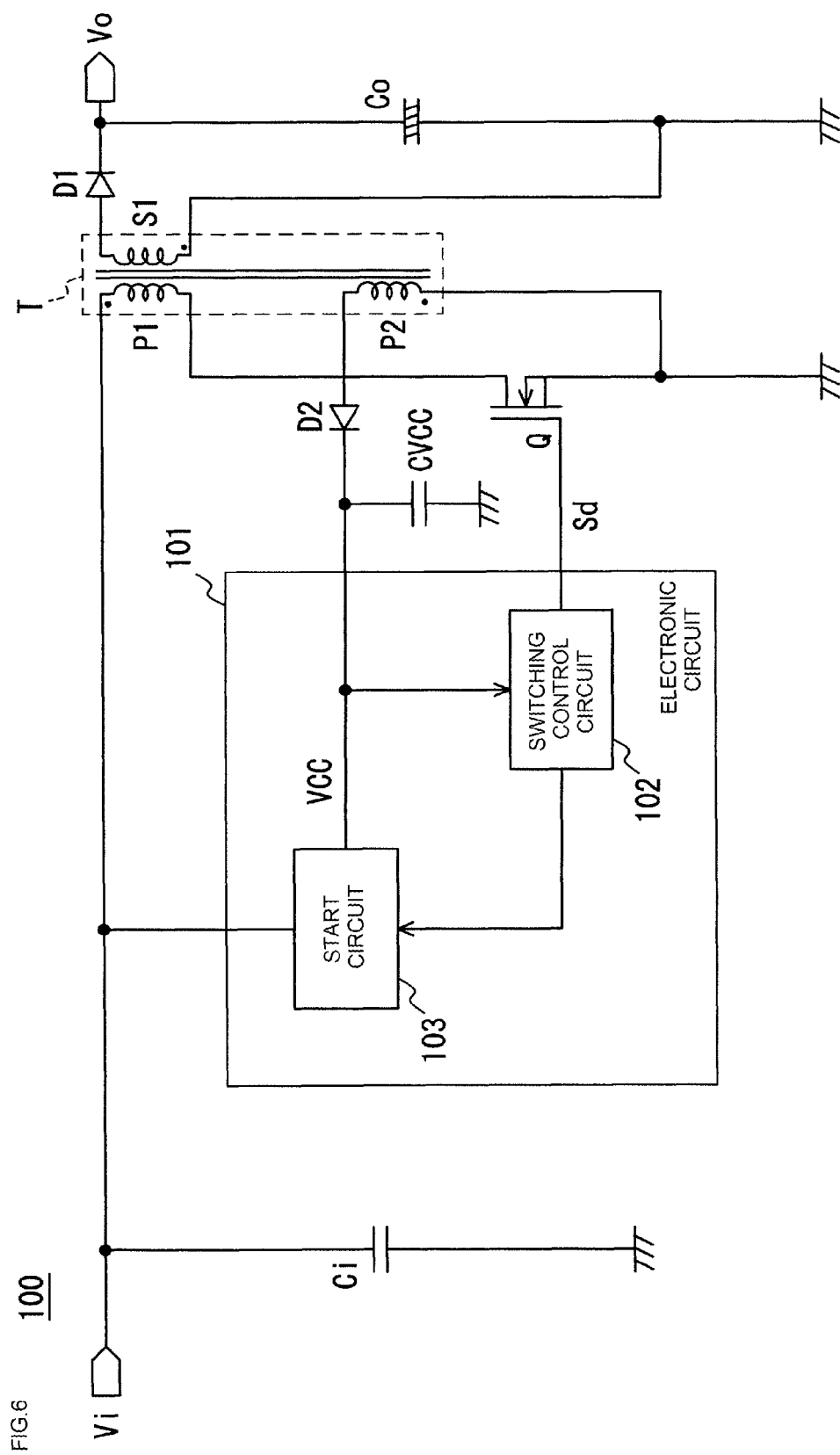
FIG. 6 is a circuit configuration diagram of an example of a switching power supply device.

FIG. 1 is referred to. Components similar to the components shown in FIG. 6 are given identical signs. A switching power supply device 1 according to a first embodiment includes an electronic circuit 10. The switching power supply device 1 may be, for example, a flyback type DC/DC converter, and the electronic circuit 10 may be, for example, an integrated circuit (IC). A capacitor CVCC is an example of an energy storage element described in the claims.

The electronic circuit 10 includes a switching control circuit 11, a start circuit 12, an initial operation control circuit 13, a switching suppression circuit 14, a comparator 15, and an OR circuit 16. The start circuit 12 is an example of a power supply circuit.

The terminal voltage of the capacitor CVCC is supplied to the power supply terminal of the switching control circuit 11 as a power supply voltage VCC. The voltage VCC is also input into the comparator 15 and comparators 20 and 30. The switching control circuit 11 receives an enable signal Se from the switching suppression circuit 14. The enable signal Se is a logic signal which causes the switching control circuit 11 to output a drive signal Sd.

For example, in the circuit shown in FIG. 1, when the enable signal Se is H level, the switching control circuit 11 outputs the drive signal Sd to a switching element Q and carries out a switching operation which turns the switching element Q on/off. When the enable signal Se is L level, the switching control circuit 11 does not output the drive signal Sd to the switching element Q. That is, the switching control circuit 11 stops the switching operation of the switching element Q. The switching element Q when the switching operation is stopped is in an off-state.

In the following description, the switching operation of the switching element Q by the switching control circuit 11 may be described simply as the "switching operation".

Next, the start circuit 12 is connected to the positive terminal of a capacitor Ci, and an input voltage Vi is applied to the start circuit 12, while the start circuit 12 is connected to the power supply terminal of the switching control circuit 11 and to one end of a primary winding P1 of a transformer T. The start circuit 12 operates with the input voltage Vi which is a primary side power source, and supplies a current which charges the capacitor CVCC. That is, the start circuit 12 supplies the capacitor CVCC with a current obtained from the primary side power source. The current supplied to the capacitor CVCC from the start circuit 12 may hereafter be described as a "start current". By so doing, the capacitor CVCC is also charged by the start circuit 12, apart from being charged with a voltage generated in an auxiliary winding P2. That is, the start circuit 12 supplies the current to the capacitor CVCC from the primary side power source without involving the transformer T.

When the switching power supply device 100 is started, the start circuit 12 charges the capacitor CVCC until the power supply voltage VCC reaches a start voltage VCCON in a period in which the electronic circuit 10 is in initial operation. When the power supply voltage VCC reaches the start voltage VCCON by charging the capacitor CVCC, the supply of the start current by the start circuit 12 is stopped, and the switching control circuit 11 starts the switching operation. A first threshold VCCOFF1 and the start voltage VCCON are, respectively, examples of a first voltage and a second voltage which are described in the claims.

The start circuit 12 receives a current control signal Scc output from the comparator 15. When the power supply voltage VCC reaches the start voltage VCCON and the initial operation is completed, the subsequent supply and stop of the start current by the start circuit 12 are controlled by the current control signal Scc. For example, in the circuit shown in FIG. 1, the start circuit 12 supplies the start current when the current control signal Scc is L level, and the start circuit 12 stops the start current when the current control signal Scc is H level.

The initial operation control circuit 13, when it has detected that the power supply voltage VCC is lower than the first threshold VCCOFF1, initializes and causes the electronic circuit 10 to start the initial operation. The switching operation stops until the start circuit 12 causes the power supply voltage VCC to rise to the start voltage VCCON in the period in which the electronic circuit 10 is in initial operation, as heretofore described. That is, the initial operation control circuit 13, when it is detected that the power supply voltage VCC is lower than the first threshold VCCOFF1, stops the switching operation until the start circuit 12 causes the power supply voltage VCC to rise to the start voltage VCCON.

The initial operation control circuit 13 includes the comparator 20, a NOT circuit 21, and a reset circuit 22. The comparator 20 is a hysteresis comparator which compares the first threshold VCCOFF1 and a start current-off voltage VHOFF, which act as a reference voltage, with the power supply voltage VCC. The comparator 20 outputs a logic signal S1 indicating a comparison result. Actually, a voltage wherein the power supply voltage VCC is divided, and a voltage wherein the first threshold VCCOFF1 and start current-off voltage VHOFF are divided at the same ratio as a ratio at which the power supply voltage VCC is divided, are input into the comparator 20, but the illustration is simplified, and the VCC and VCCOFF1/VHOFF are directly input for ease of understanding. The voltage division of an input signal applies equally to the determination of the power supply voltage VCC in the comparator 20 and 30 and reset circuit 22, to be described hereafter.

The NOT circuit 21 outputs the logical inversion signal of the output signal S1 as a reset signal Sr. The reset signal Sr is a logic signal which resets the electronic circuit 10.

For example, in the circuit shown in FIG. 1, the first threshold VCCOFF1 and start current-off voltage VHOFF are input into the inverting input terminal of the comparator 20, and the power supply voltage VCC is input into the non-inverting input terminal. The comparator 20 has hysteresis characteristics, and when the power supply voltage VCC drops and becomes lower than the first threshold VCCOFF1, the output signal S1 of the comparator 20 turns to L level, and the reset signal Sr turns to H level. Also, when the power supply voltage VCC rises and reaches the start current-off voltage VHOFF, the output signal S1 of the comparator 20 turns to H level, and the reset signal Sr turns to L level.

The reset signal Sr is input into the reset circuit 22 and OR circuit 16. When the reset signal Sr turns to H level, the reset circuit 22 resets the electronic circuit 10 and starts the initial operation of the electronic circuit 10. In the period in which the electronic circuit 10 is in initial operation, the start circuit 12 starts the supply of the start current, and charges the capacitor CVCC until the power supply voltage VCC reaches the start voltage VCCON. When the power supply voltage VCC reaches the start voltage VCCON, the start circuit 12 stops the start current. Also, in the period in which the electronic circuit 10 is in initial operation, the switching control circuit 11 stops the switching operation until the start circuit 12 causes the power supply voltage VCC to rise to the start voltage VCCON. The switching control circuit 11 starts the switching operation after the power supply voltage VCC has risen to the start voltage VCCON.

Next, the comparator 15 compares a start current-on voltage VHON and the start current-off voltage VHOFF, which act as a reference voltage, with the power supply voltage VCC, and outputs a result of the comparison as a current control signal Scc. For example, in the circuit shown in FIG. 1, the start current-off voltage VHOFF and start current-on voltage VHON are input into the inverting input terminal of the comparator 15, and the power supply voltage VCC are input into the non-inverting input terminal. The comparator 15 has hysteresis characteristics, and when the power supply voltage VCC drops and becomes lower than the start current-on voltage VHON, the current control signal Scc turns to L level. Also, when the power supply voltage VCC rises and reaches the start current-off voltage VHOFF or more, the current control signal Scc turns to H level.

The start current-off voltage VHOFF is equal to or less than the start voltage VCCON and larger than the first threshold VCCOFF1. The start current-on voltage VHON is smaller than the start current-off voltage VHOFF and larger than the first threshold VCCOFF1. When the current control signal Scc is L level, the start circuit 12 supplies the start current. Also, when the current control signal Scc is H level, the start circuit 12 does not supply the start current.

As a result of this, when the power supply voltage VCC drops and becomes lower than the start current-on voltage VHON, the start circuit 12 starts the supply of the start current, and when the power supply voltage VCC rises and reaches the start current-off voltage VHOFF, the start circuit 12 stops the start current. The start current-off voltage VHOFF and start current-on voltage VHON are examples of a fourth voltage and a fifth voltage which are described in the claims.

Next, the switching suppression circuit 14, when it has detected that the power supply voltage VCC is lower than a second threshold VCCOFF2, stops the switching operation for a predetermined, specified stop time Ts. The second threshold VCCOFF2 is an example of a third voltage described in the claims, and is higher than the first threshold VCCOFF1 and lower than the start current-on voltage VHON. The specified stop time Ts is an example of a predetermined period described in the claims.

It is only necessary that the second threshold VCCOFF2 is higher than the first threshold VCCOFF1. Therefore, the difference between the second threshold VCCOFF2 and the first threshold VCCOFF1 may be comparatively small. For example, the difference between the second threshold VCCOFF2 and the first threshold VCCOFF1 may be smaller than the difference between the second threshold VCCOFF2 and the start current-on voltage VHON or the difference between the start current-on voltage VHON and the start current-off voltage VHOFF.

The switching suppression circuit 14 includes the comparator 30, a NAND circuit 31, an RS flip-flop 32, a NOT circuit 33, and a detection circuit 34. The comparator 30 is a hysteresis comparator which compares the second threshold VCCOFF2 and start current-on voltage VHON, which act as a reference, with the power supply voltage VCC, and outputs a logic signal S2 indicating a comparison result. For example, in the circuit shown in FIG. 1, the second threshold VCCOFF2 and start current-on voltage VHON are input into the inverting input terminal of the comparator 30, and the power supply voltage VCC is input into the non-inverting input terminal. The comparator 30 has hysteresis characteristics, and when the power supply voltage VCC drops and becomes lower than the second threshold VCCOFF2, the output signal S2 of the comparator 30 turns to L level. Also, when the power supply voltage VCC rises and reaches the start current-on voltage VHON, the output signal S2 turns to H level.

The NAND circuit 31 generates a logical inversion signal of the logical product of the output signal S2 of the comparator 30 and a protection signal Sp, and inputs the logical inversion signal into a set terminal S of the RS flip-flop 32. The protection signal Sp is a logic signal indicating that an unshown circuit has detected some anomaly such as overcurrent. In the example shown in FIG. 1, when no anomaly is detected, the protection signal Sp is kept at H level. In order to stop the switching operation when an anomaly is detected, the output of the NAND circuit 31 is turned to H level by turning the protection signal Sp to L level. In the same way, even when the output signal S2 of the comparator 30 is L level, the output of the NAND circuit 31 turns to H level.

When the output of the NAND circuit 31 turns to H level, an output Q of the RS flip-flop 32 is set to H level, and the value of the enable signal Se, which is a logical inversion signal of the output Q generated by the NOT circuit 33, changes from H level to L level. As a result of this, the switching control circuit 11 stops the output of the drive signal Sd. That is, the switching control circuit 11 stops.

The output Q is also input into an input terminal In of the detection circuit 34. The detection circuit 34 starts timing when the output Q changes to H level, and detects whether or not the time for which the output Q is H level reaches the specified stop time Ts. That is, the detection circuit 34 detects whether or not the specified stop time Ts elapses from the switching operation stopping. The detection circuit 34 may be, for example, a counter circuit or timer circuit which detects a lapse of the specified stop time Ts. The specified stop time Ts may be, for example, 810 ms. The detection circuit 34 outputs a return signal from an output terminal Out. The return signal changes from L level to H level when the detection circuit 34 detects a lapse of the specified stop time Ts. The detection circuit 34 is reset to L level when a signal input into the input terminal In turns to L level.

The OR circuit 16 generates the OR signal of the reset signal Sr and return signal. The OR signal is input into a reset terminal R of the RS flip-flop 32 and a reset terminal R of the detection circuit 34.

Therefore, when the detection circuit 34 detects a lapse of the specified stop time Ts, the signal input into the reset terminal R of the RS flip-flip 32 turns to H level, and the RS flip-flop 32 is reset. As a result of this, the value of the enable signal Se changes from L level to H level, and the switching operation is restarted. The RS flip-flop 32 and the NOT circuit 33 are examples of a return circuit described in the claims. Also, when the signal input into the reset terminal R of the detection circuit 34 turns to H level, the detection circuit 34 is reset, and the return signal returns to L level from H level. Even when the reset signal Sr turns to H level and the electronic circuit 10 is reset, the RS flip-flop 32 and the detection circuit 34 are reset.

In this way, the switching suppression circuit 14, by detecting that the power supply voltage VCC is lower than the second threshold VCCOFF2, can stop the switching operation for the specified stop time Ts. The specified stop time Ts is determined by a measurement time which is set in the detection circuit 34 regardless of the capacitance of the capacitor CVCC. Therefore, according to the switching power supply device 1 of the first embodiment, it is possible to increase the degree of freedom to set a time for which to stop the switching operation when overload or load short circuit occurs. Also, it is possible to increase the degree of freedom to design the capacitor CVCC.

Operation

Figure 2A:
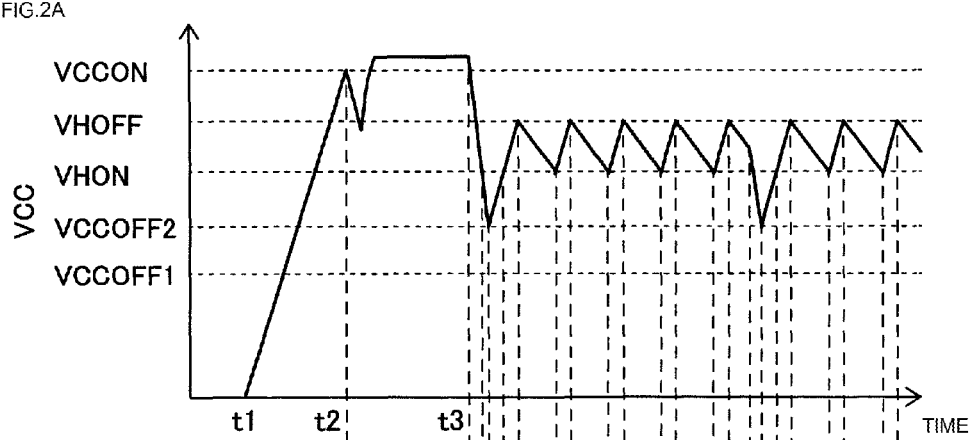
FIGS. 2A through 2G are illustrations of examples of an operation of the switching power supply device shown in FIG. 1.
Figure 2B:
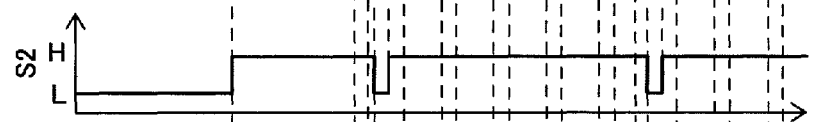
Figure 2C:
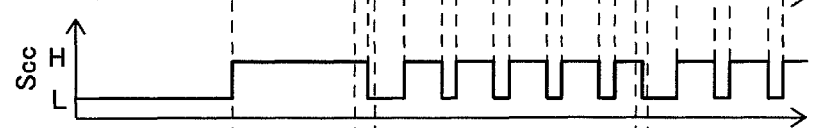
Figure 2D:
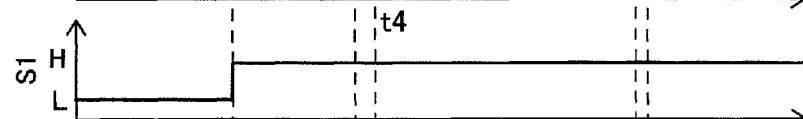
Figure 2E:
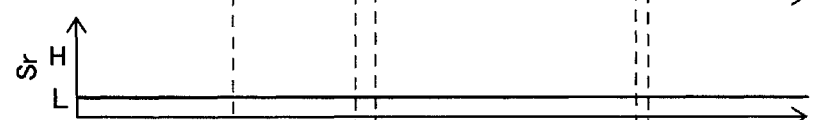
Figure 2F:
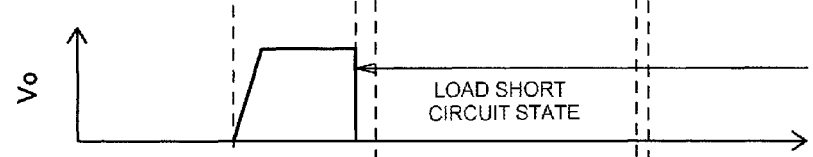
Figure 2G:
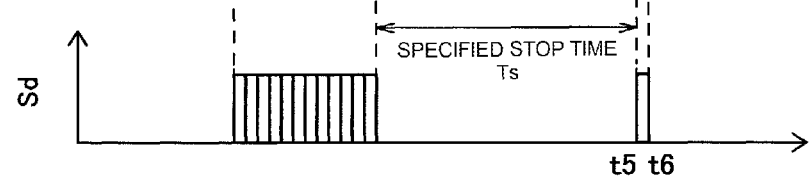

Next, a description will be given, referring to FIGS. 2A through 2G, of examples of an operation of the switching power supply device 1 according to the first embodiment. FIG. 2A is a timing chart of the power supply voltage VCC, FIG. 2B is a timing chart of the output signal S2 of the comparator 30, FIG. 2C is a timing chart of the current control signal Scc, FIG. 2D is a timing chart of the output signal S1 of the comparator 20, FIG. 2E is a timing chart of the reset signal Sr, FIG. 2F is a timing chart of an output voltage Vo, and FIG. 2G is a timing chart of the drive signal Sd.

When the switching power supply device 1 is started at a time t1, the initial operation of the electronic circuit 10 is started by the initial operation control circuit 13, and the start circuit 12 starts the supply of the start current to the capacitor CVCC. By so doing, the power supply voltage VCC rises. As the reset circuit 22 invalidates the operations of the other circuits of the electronic circuit 10 during the initial operation, the signals shown in FIGS. 2B to 2G do not change until a time t2. When the power supply voltage VCC reaches the start voltage VCCON at the time t2, the initial operation control circuit 13 finishes the initial operation of the electronic circuit 10, and the switching control circuit 11 starts the switching operation. By so doing, the output voltage Vo rises. Also, the start circuit 12 stops the supply of the start current.

The reason for the power supply voltage VCC to drop slightly immediately after the switching operation starts at the time t2 is that the switching control circuit 11, which has started the output of the drive signal Sd, consumes the energy of the capacitor CVCC before being supplied with sufficient power from the auxiliary winding P2.

When the output voltage Vo drops due to overload or load short circuit at a time t3, the power supply voltage VCC drops. When the power supply voltage VCC becomes lower than the start current-on voltage VHON, the current control signal Scc which is the output of the comparator 15 turns to L level, and the start circuit 12 starts the supply of the start current.

At a time t4, when the power supply voltage VCC becomes lower than the second threshold VCCOFF2, the output signal S2 of the comparator 30 turns to L level, and the output Q of the RS flip-flop 32 changes to H level. As a result of this, the value of the enable signal Se output from the switching suppression circuit 14 changes from H level to L level, and the switching operation is stopped. As the start current is supplied and the switching operation stops, the power supply voltage VCC starts to rise.

When the power supply voltage VCC reaches the start current-off voltage VHOFF, the current control signal Scc which is the output of the comparator 15 turns to H level, and the start current stops. Then, as the switching operation is stopped, the electronic circuit 10 consumes the energy of the capacitor CVCC in a condition in which there is no power supply from the auxiliary winding P2 (the electronic circuit 10 consumes some energy even though the switching operation is stopped), and the power supply voltage VCC drops.

As the start current is not supplied after that until the power supply voltage VCC becomes lower than the start current-on voltage VHON, the power supply voltage VCC changes within the range from the start current-on voltage VHON to the start current-off voltage VHOFF. That is, the comparator 15 repeats the operation of causing the start circuit 12 to start the supply of the start current when the power supply voltage VCC becomes lower than the start current-on voltage VHON, and causing the start circuit 12 to stop the supply of the start current when the power supply voltage VCC reaches the start current-off voltage VHOFF. In this way, the comparator 15 operates as a current control circuit which, by controlling the supply of the start current, maintains the power supply voltage VCC within the range, which is higher than the first threshold VCCOFF1, while the switching suppression circuit 14 is stopping the switching operation. Consequently, the reset signal Sr is keeping L level.

When the specified stop time Ts elapses from the stop of the switching operation at a time t5, the detection circuit 34 detects the lapse of the specified stop time Ts. Then, the RS flip-flop 32 is reset, and the output Q changes to L level. As a result of this, the value of the enable signal Se changes from L level to H level, and the switching operation restarts.

In this way, whether or not to restart the switching operation is determined based on the detection of a lapse of the preset, specified stop time Ts. For example, as seen from FIGS. 2A and 2G, no matter what value the power supply voltage VCC is in the range from the start current-on voltage VHON to the start current-off voltage VHOFF, the switching operation restarts at a point at which the specified stop time Ts elapses. That is, the switching operation restarts regardless of the condition of the power supply voltage VCC. Therefore, it is possible to set the specified stop time Ts regardless of the capacitor CVCC.

A case is assumed in which an overload state or a load short circuit state is continuing at the point at which the specified stop time Ts elapses. As the current consumption of the switching suppression circuit 14 increases when the switching operation is restarted, the power supply voltage VCC drops to the start current-on voltage VHON or less again. When the power supply voltage VCC becomes lower than the second threshold VCCOFF2 at a time t6, the value of the enable signal Se changes from H level to L level, and the switching operation stops.

Next, a description will be given, referring to FIGS. 3A through 3G, of other examples of the operation of the switching power supply device 1 according to the first embodiment. FIG. 3A is a timing chart of the power supply voltage VCC, FIG. 3B is a timing chart of the output signal S2 of the comparator 30, and FIG. 3C is a timing chart of the current control signal Scc. FIG. 3D is a timing chart of the output signal S1 of the comparator 20, and FIG. 3E is a timing chart of the reset signal Sr. FIG. 3F is a timing chart of the output voltage Vo, and FIG. 3G is a timing chart of the drive signal Sd.

The operations at the times t1 to t4 are the same as the operations described referring to FIGS. 2A through 2G. In the operation examples in FIGS. 3A through 3G, a case is assumed in which the overload state or load short circuit state resolves at the time t5. When the specified stop time Ts elapses from the stop of the switching operation at the time t6, the switching operation restarts. Then, the output voltage Vo rises, and the power supply voltage VCC rises. When the output voltage Vo reaches a rated output, the power supply voltage VCC returns to the value thereof before the overload or load short circuit occurs.

As shown in FIGS. 2A and FIG. 3A, the second threshold VCCOFF2 may be set to a value lower than the start current-on voltage VHON. There is the possibility that when the second threshold VCCOFF2 is higher than the start current-on voltage VHON, the power supply voltage VCC is lower than the second threshold VCCOFF2 at the point at which the specified stop time Ts elapses. In this case, as the switching operation stops again, the switching does not restart even when the specified stop time Ts elapses. By setting the second threshold VCCOFF2 to a value lower than the start current-on voltage VHON, it is possible to set the specified stop time Ts appropriately.

The setting may be such that when the second threshold VCCOFF2 is set to a value lower than the start current-on voltage VHON, the start current supplied by the start circuit 12 is made smaller than the current consumed by the electronic circuit 10 during the switching operation, and that the power supply voltage VCC drops when the switching operation is carried out in a condition in which no current is supplied to the capacitor CVCC from the auxiliary winding P2. The reason is that as the power supply voltage VCC does not become smaller than the start current-on voltage VHON unless the power supply voltage VCC drops during the switching operation, the switching suppression circuit 14 does not stop the switching operation.

A description will be given of an initialization of and the subsequent initial operation of the electronic circuit 10 when the power supply voltage VCC drops and becomes lower than the first threshold VCCOFF1. FIGS. 3A through 3G are referred to. A case is assumed in which the power supply voltage VCC drops at a time t7 due to, for example, a drop in the input voltage Vi.

At a time t8, when the power supply voltage VCC becomes lower than the second threshold VCCOFF2, the value of the enable signal Se changes from H level to L level, and the switching operation stops. At a time t9, when the power supply voltage VCC becomes lower than the first threshold VCCOFF1, the output signal S1 of the comparator 20 turns to L level. Therefore, the reset signal Sr turns to H level, and the electronic circuit 10 is initialized. Therefore, the stop of the switching operation is maintained.

A case is assumed in which the input voltage Vi returns after that. As the initial operation of the electronic circuit 10, the start circuit 12 starts the supply of the start current. As the switching operation stops, the power supply voltage VCC rises. When the power supply voltage VCC reaches the start voltage VCCON at a time t10, the initial operation control circuit 13 stops the start current of the start circuit 12, the initial operation of the electronic circuit 10 finishes, and the switching operation restarts. Also, subsequently, the output voltage Vo returns to the rated output owing to the switching operation, and the power supply voltage VCC returns to the value before the drop in the input voltage Vi.

Advantages of First Embodiment (1) The switching power supply device 1 according to the first embodiment includes the switching suppression circuit 14 which, when it is detected that the power supply voltage VCC is lower than the second threshold VCCOFF2, stops the switching operation for the specified stop time Ts. As a result of this, it is possible to set the specified stop time Ts regardless of the capacitance of the capacitor CVCC. Therefore, it is possible to increase the degree of freedom to set the stop time of the switching operation when overload or load short circuit occurs, and it is easy to set the stop time. Also, as it is possible to set the capacitance of the capacitor CVCC regardless of the stop time, it is possible to increase the degree of freedom to design the capacitance of the capacitor CVCC.

When the stop time of the switching operation depends on the capacitance of the capacitor CVCC, it is necessary to increase the capacitance of the capacitor CVCC in order to secure the stop time. In this case, there are the problems of an increase in the start time of the switching power supply device, an increase in the cost of the capacitor CVCC, an increase in the size of the switching power supply device, and the like. According to the switching power supply device 1 of the first embodiment, it is possible to solve the problems.

Also, a switching power supply device described in Japanese Patent Application Publication No. 2008-54478 has to switch a start current with a high voltage device. Therefore, there is the problem of an increase in chip area and cost. Also, as a stop time depends on the capacitance of a capacitor charged with the start current, the degree of freedom to design the capacitor decreases. According to the switching power supply device 1 of the first embodiment, it is possible to avoid the problems.

(2) The switching suppression circuit 14 includes the detection circuit 34, which detects whether or not the specified stop time Ts elapses, and the RS flip-flop 32 and NOT circuit 33 which restart the switching operation after a lapse of the specified stop time Ts is detected. Therefore, it is possible to restart the switching operation at the point at which the specified stop time Ts elapses.

(3) The start circuit 12 stops the supply of the start current, when the power supply voltage VCC rises to the start current-off voltage VHOFF equal to or less than the start voltage VCCON, for the specified stop time Ts for which the switching operation stops. The RS flip-flop 32 and the NOT circuit 33, even when the power supply voltage VCC is lower than the start current-off voltage VHOFF, restart the switching operation after a lapse of the specified stop time Ts. Therefore, it is possible to restart the switching operation, regardless of the condition of the power supply voltage VCC, at the point at which the preset, specified stop time Ts elapses.

(4) The start circuit 12 supplies the start current when the power supply voltage VCC becomes lower than the start current-on voltage VHON. Also, the start current-on voltage VHON is higher than the first threshold VCCOFF1. Therefore, it is possible to prevent the power supply voltage VCC form dropping to the first threshold VCCOFF1 when overload or load short circuit occurs. As a result of this, as it is possible to prevent the switching operation starting after the initialization of the electronic circuit 10, it is possible to prevent the stop time of the switching operation from becoming shorter than the specified stop time Ts.

Second Embodiment

Configuration

Figure 4:
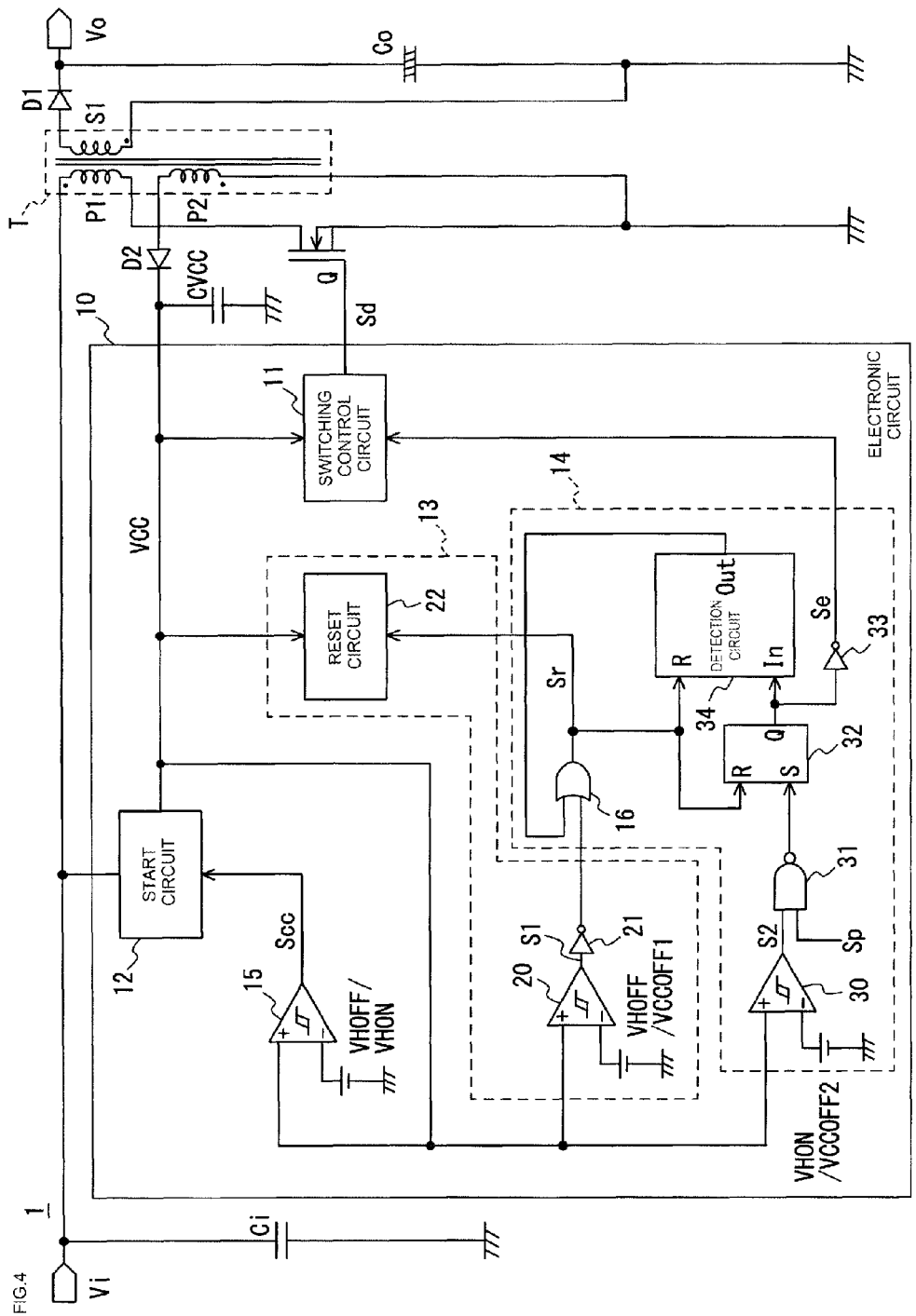
FIG. 4 is a circuit configuration diagram of an example of a switching power supply device according to a second embodiment.

Next, a description will be given of a switching power supply device 1 according to a second embodiment. In the second embodiment, when the power supply voltage VCC is less than a predetermined voltage at the point at which a lapse of the specified stop time Ts is detected, the switching suppression circuit 14 restarts the switching operation after the power supply voltage VCC rises to the predetermined voltage. The predetermined voltage may be, for example, the start voltage VCCON, and may be an optional value within a range of from larger than the start current-on voltage VHON to equal to or less than the start voltage VCCON. For example, the predetermined voltage may be the start current-off voltage VHOFF Hereafter, a description will be given, referring to FIG. 4, of an example in which the predetermined voltage is the start voltage VCCON. Components similar to the components shown in FIG. 1 are given identical signs. As the switching operation is restarted after the power supply voltage VCC rises to the start voltage VCCON after a lapse of the specified stop time Ts, the switching suppression circuit 14 starts the initial operation of the electronic circuit 10 after the lapse of the specified stop time Ts.

The switching suppression circuit 14 includes the OR circuit 16 and inputs the OR signal generated by the OR circuit 16 into the reset circuit 22 as the reset signal Sr. The OR signal is the OR signal of the return signal output by the detection circuit 34 and the output of the NOT circuit 21. Therefore, when the detection circuit 34 detects a lapse of the specified stop time Ts, the reset signal Sr turns to H level, and the electronic circuit 10 is initialized.

As a result of this, the switching control circuit 11 restarts the switching operation after the power supply voltage VCC rises to the start voltage VCCON. The OR circuit 16 which initializes the electronic circuit 10 after a lapse of the specified stop time Ts is an example of the return circuit described in the claims.

Operation

Figure 5A:
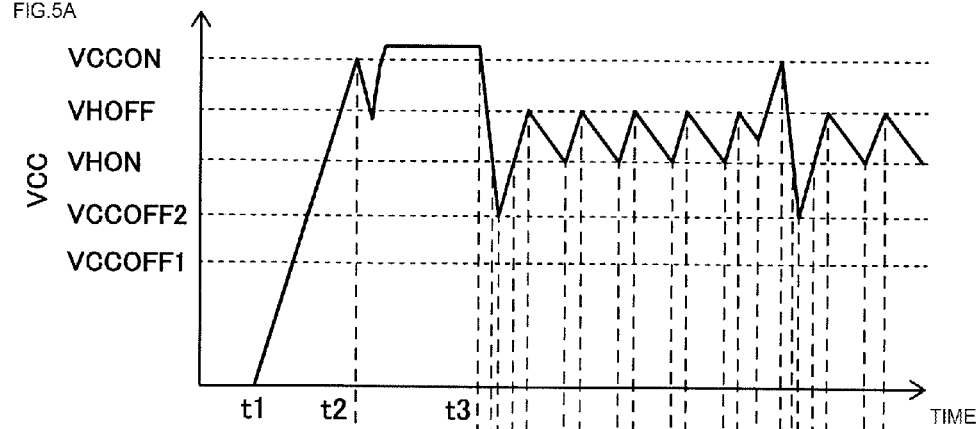
FIGS. 5A through 5G are illustrations of examples of an operation of the switching power supply device shown in FIG. 4.
Figure 5B:
Figure 5C:
Figure 5D:
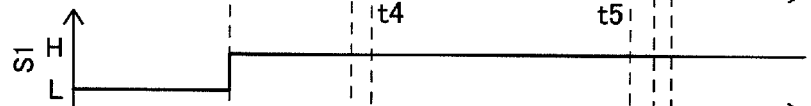
Figure 5E:
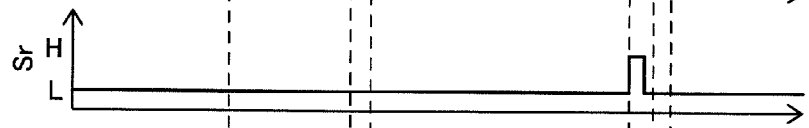
Figure 5F:
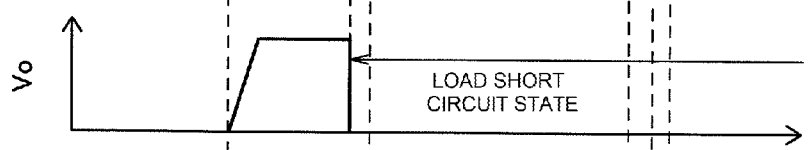
Figure 5G:
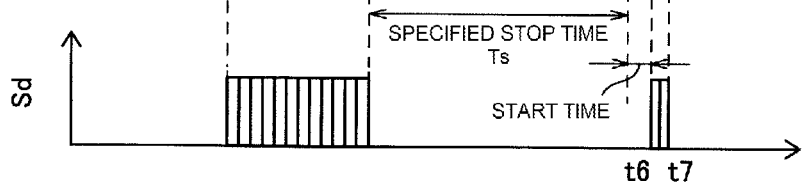

Next, a description will be given, referring to FIGS. 5A through 5G, of examples of an operation of the switching power supply device 1 according to the second embodiment. FIG. 5A is a timing chart of the power supply voltage VCC, FIG. 5B is a timing chart of the output signal S2 of the comparator 30, and FIG. 5C is a timing chart of the current control signal Scc. FIG. 5D is a timing chart of the output signal S1 of the comparator 20, and FIG. 5E is a timing chart of the reset signal Sr. FIG. 5F is a timing chart of the output voltage Vo, and FIG. 5G is a timing chart of the drive signal Sd.

The operations at the times t1 to t4 are the same as the operations described referring to FIGS. 2A through 2G. When the specified stop time Ts elapses from the stop of the switching operation at the time t5, the detection circuit 34 detects a lapse of the specified stop time Ts, and the return signal changes to H level. Then, the reset signal Sr turns to H level, and the electronic circuit 10 is initialized. Therefore, the stop of the switching operation is maintained. The electronic circuit 10 is initialized, and the initial operation starts, thereby supplying the start current to the capacitor CVCC. As a result of this, the power supply voltage VCC rises. At the time t6, the power supply voltage VCC reaches the start voltage VCCON.

The stop of the switching operation is maintained between the times t5 and t6 which form the start time after the initialization of the electronic circuit 10. After the initialization is completed at the time t6, that is, after the power supply voltage VCC rises to the start voltage VCCON, the switching operation is restarted.

In the event that the overload state or load short circuit state is continuing, the power supply voltage VCC drops again by the restart of the switching operation. At the time t7, when the power supply voltage VCC reaches the second threshold VCCOFF2, the value of the enable signal Se changes from H level to L level, and the switching operation stops.

Advantages of Second Embodiment

The switching power supply device 1 of the second embodiment is such that after the power supply voltage VCC rises to the predetermined voltage after a lapse of the specified stop time Ts is detected, the switching suppression circuit 14 restarts the switching operation. Therefore, even when the power supply voltage VCC is low when the specified stop time Ts elapses, it is possible to prevent the switching operation from restarting at a low power supply voltage VCC.

Each heretofore described embodiment describes an illustrative circuit configuration, and the switching power supply device according to the disclosure is not limited to a circuit having the circuit configuration. For example, which one of positive logic or negative logic is to be used as the value of each of the logic signals shown in the heretofore described embodiments can be appropriately alternated, and the disclosure is not limited to the illustrations shown in the embodiments.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A switching power supply device, comprising:
   a switching element configured to be connected to a power source via a primary winding of a transformer;
   an energy storage element configured to be charged with a voltage generated in an auxiliary winding of the transformer;
   a switching control circuit configured to receive a terminal voltage of the energy storage element as a power supply voltage and to control a switching operation of the switching element;
   a current supply circuit configured to supply a current from the power source to the energy storage element, thereby charging the energy storage element, without the current having to pass through the transformer to charge the energy storage element;
   an initial operation control circuit configured to
      detect whether the power supply voltage is lower than a first threshold voltage, which is a first voltage level, and
      upon detecting that the power supply voltage is lower than the first threshold voltage, stop the switching operation until the power supply voltage increases to a second voltage level due to the charging the energy storage element with the current supplied by the current supply circuit; and
   a switching suppression circuit configured to
      detect whether the power supply voltage is lower than a second threshold voltage, which is a third voltage level higher than the first voltage level and lower than the second voltage level, and
      upon detecting that the power supply voltage is lower than the second threshold voltage, stop the switching operation for a predetermined period, the predetermined period having a length of time set in the switching power supply device.

2. The switching power supply device according to claim 1, wherein the switching suppression circuit includes:
   a detection circuit configured to detect elapse of the predetermined period, wherein the length of time of the predetermined period is set in the detection circuit; and
   a return circuit configured to restart the switching operation after the detection circuit detects the elapse of the predetermined period.

3. The switching power supply device according to claim 2, wherein the current supply circuit is configured to
   start supplying the current from the power source to the energy storage element when the power supply voltage becomes lower than a fifth voltage level which is higher than the first voltage after the initial operation control circuit ceases stopping the switching operation, and
   stop supplying the current to the energy storage element when the power supply voltage rises to a fourth voltage level which is equal to or less than the second voltage.

4. The switching power supply device according to claim 3, wherein
   the return circuit is configured to restart the switching operation after a lapse of the predetermined period even when the power supply voltage is lower than the fourth voltage level.

5. The switching power supply device according to claim 3, wherein
   the return circuit is configured to restart the switching operation after the power supply voltage rises to the predetermined voltage when the power supply voltage is less than a predetermined voltage level at a point at which a lapse of the predetermined period is detected.

6. The switching power supply device according to claim 3, wherein the third voltage level is lower than the fifth voltage level.

7. The switching power supply device according to claim 4, wherein the third voltage level is lower than the fifth voltage level.

8. The switching power supply device according to claim 5, wherein the third voltage level is lower than the fifth voltage level.

9. The switching power supply device according to claim 1, wherein the switching power supply device is a flyback converter.

10. The switching power supply device according to claim 9, further comprising:
    a rectifier diode having an anode connected to a secondary winding of the transformer; and
    an output capacitor connected to a cathode of the rectifier diode.

* * * * *